(12) United States Patent
Ashikaga

(10) Patent No.: US 8,340,467 B2
(45) Date of Patent: Dec. 25, 2012

(54) INFORMATION PROCESSOR, INFORMATION PROCESSING METHOD, AND COMPUTER READABLE MEDIUM

(75) Inventor: Hideaki Ashikaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 819 days.

(21) Appl. No.: 12/475,431

(22) Filed: May 29, 2009

(65) Prior Publication Data

US 2010/0150400 A1 Jun. 17, 2010

(30) Foreign Application Priority Data

Dec. 17, 2008 (JP) ................................ 2008-321526

(51) Int. Cl.
*G06K 9/32* (2006.01)
(52) U.S. Cl. ...................................................... 382/294
(58) Field of Classification Search .................. 345/651, 345/662, 677, 667, 668, 669, 670, 671, 672; 348/95, 129, 134; 382/218, 221, 294, 295, 382/296, 298; 700/57
See application file for complete search history.

(56) References Cited

U.S. PATENT DOCUMENTS

2007/0206233 A1\* 9/2007 Koyama et al. ............... 358/462

FOREIGN PATENT DOCUMENTS

| JP | 05336512 A | 12/1993 |
| JP | 2007133823 A | 5/2007 |
| JP | 2007-241356 A | 9/2007 |

OTHER PUBLICATIONS

Notification of Reasons for Refusal dated Sep. 18, 2012 issued by the Japanese Patent Office in corresponding Japanese Patent Application No. 2008-321526.
Naito, et al., Evaluation of Various Motion-Compensated Predictive Coding Methods Applied for MPEG-2, KDD R&D Laboratories, 12 pgs total.

\* cited by examiner

*Primary Examiner* — Gregory F Cunningham
(74) *Attorney, Agent, or Firm* — Sughrue Mion, PLLC

(57) ABSTRACT

A first movement control section sequentially moves a first image to multiple first positions. A first comparison section compares the moved first image with a second image. A target first position selection section selects a target first position based on the result of said comparison. After the target first position is selected, the second movement control section sequentially moves the first image to multiple second positions located in the periphery of the target first position. The second comparison section compares the moved first image with the second image. A target second position selection section selects a target second position based on the result of said comparison. A second position alignment execution section performs geometric transformation based on the difference between the position of the first image and the target second position and aligns the positions of the first and second images.

10 Claims, 10 Drawing Sheets

INFORMATION PROCESSOR, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2008-321526 filed Dec. 17, 2008.

BACKGROUND

1. Technical Field

The present invention relates to an information processor, an information processing method and a computer readable medium.

2. Related Art

A technology of aligning the positions of a first image and a second image has been proposed.

SUMMARY

According to an aspect of the invention, an information processor includes: a first movement control section that sequentially moves a first image from a reference position to multiple first positions, in which displacements in a reference direction between the reference position and the multiple first positions are multiples of a reference distance, by performing a first process including at least one geometric transformation process for the first image; a first comparing section that compares the first image having been subjected to the first process with a second image each time the first movement control section performs the first process; a target first position selecting section that selects a target first position from among the multiple first positions based on the comparison result of the first comparing section; a second movement control section that sequentially moves the first image from the reference position to multiple second positions, in which displacements in the reference direction between the target first position and the multiple second positions are smaller than the reference distance, by performing a second process including at least one geometric transformation process for the first image after the target first position is selected; a second comparing section that compares the first image having been subjected to the second process with the second image each time the second movement control section performs the second process; a target second position selecting section that selects a target second position from among the multiple second positions based on the comparison result of the second comparing section; and a position aligning section that aligns the positions of the first image and the second image by performing a geometric transformation process for the first image based on the difference between the reference position and the target second position.

The above-mentioned programs may be provided via a communication network, such as the Internet, or may be stored on various kinds of computer-readable information recording media, such as flexible disks, CD-ROMs and DVD-ROMs, and provided as such information recording media.

Furthermore, the above-mentioned programs may be recorded on computer-readable information recording media. As such information recording media, for example, magnetic tapes, flexible disks, hard disk drives, CD-ROMs, MOs, MDs, DVD-ROMs and IC cards can be used.

BRIEF DESCRIPTION OF THE DRAWINGS

Exemplary embodiment(s) of the present invention will be described in detail based on the following figures, wherein:

FIG. 6 is a view showing second positions;

DETAILED DESCRIPTION

[1. Hardware Configuration]

Figure 1:
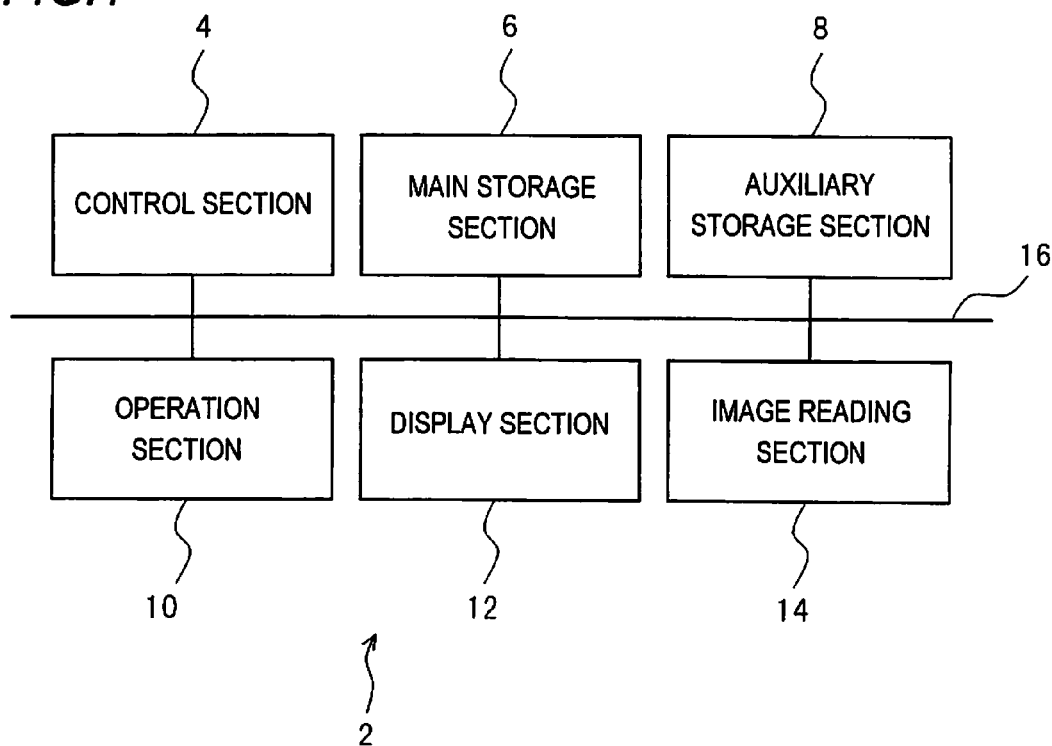
FIG. 1 is a view showing the hardware configuration of an information processor according to an exemplary embodiment of the present invention.

An exemplary embodiment according to the present invention will be described below referring to the accompanying drawings. FIG. 1 is a view showing the hardware configuration of an information processor 2 according to the exemplary embodiment of the present invention. As shown in the figure, the information processor 2 is a computer system containing a control section 4, a main storage section 6, an auxiliary storage section 8, an operation section 10, a display section 12, and an image reading section 14. Data exchange is made possible among the respective sections via a bus 16.

The control section 4 is formed of a microprocessor, for example. The control section 4 executes information processing according to programs stored in the main storage section 6.

The main storage section 6 is formed of a RAM, for example. The above-mentioned programs are stored in the main storage section 6. Furthermore, various kinds of data required for information processing are stored in the main storage section 6.

The auxiliary storage section 8 is formed of a hard disk drive, for example. Various kinds of data are stored in the auxiliary storage section 8. For example, a first manuscript image and a second manuscript image having been read using the image reading section 14 described later are stored in the auxiliary storage section 8.

The operation section 10 is a user interface for the user to perform input operation. The operation section 10 is composed of a keyboard and a mouse, for example.

The display section 12 is formed of a display, such as a liquid crystal display monitor. The display section 12 displays information output from the control section 4.

The image reading section 14 is formed of a scanner, for example. The image reading section 14 scans a manuscript, obtains the image (bit map data) of the manuscript and stores the image in the auxiliary storage section 8. In this exemplary embodiment, the image reading section 14 scans a manuscript X, obtains the image of the manuscript X (hereafter described as "first manuscript image") and stores the image in the auxiliary storage section 8. Furthermore, the image reading section 14 scans a manuscript Y in which additional portions or white-painted portions were added to the manuscript X, obtains the image of the manuscript Y (hereafter described as "second manuscript image"), and stores the image in the auxiliary storage section 8.

Figure 2A:
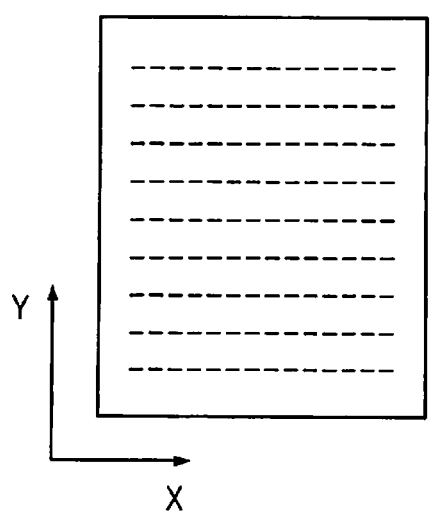
FIG. 2A is a view showing an example of a first manuscript image.
Figure 2B:
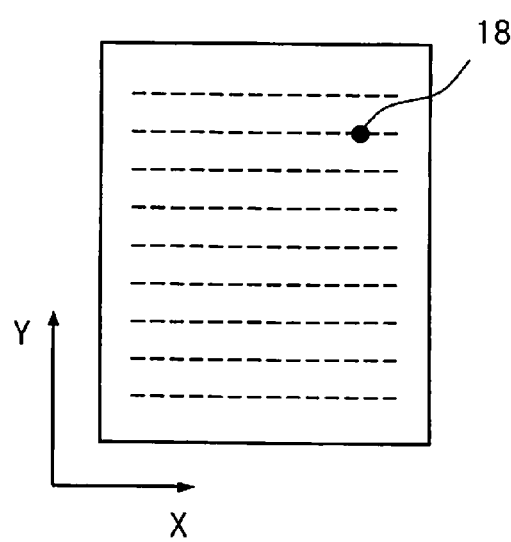
FIG. 2B is a view showing an example of a second manuscript image.

FIGS. 2A and 2B are views showing examples of the first and second manuscript images; FIG. 2A shows an example of the first manuscript image, and FIG. 2B shows an example of the second manuscript image. As shown in FIG. 2B, the second manuscript image includes the image 18 of an added portion.

In an image obtained using the image reading section 14, an X-axis and a Y-axis being orthogonal to each other are set. The position of each pixel is specified by its X and Y coordinate values.

[2. Processing Executed by the Information Processor]

Figure 3:
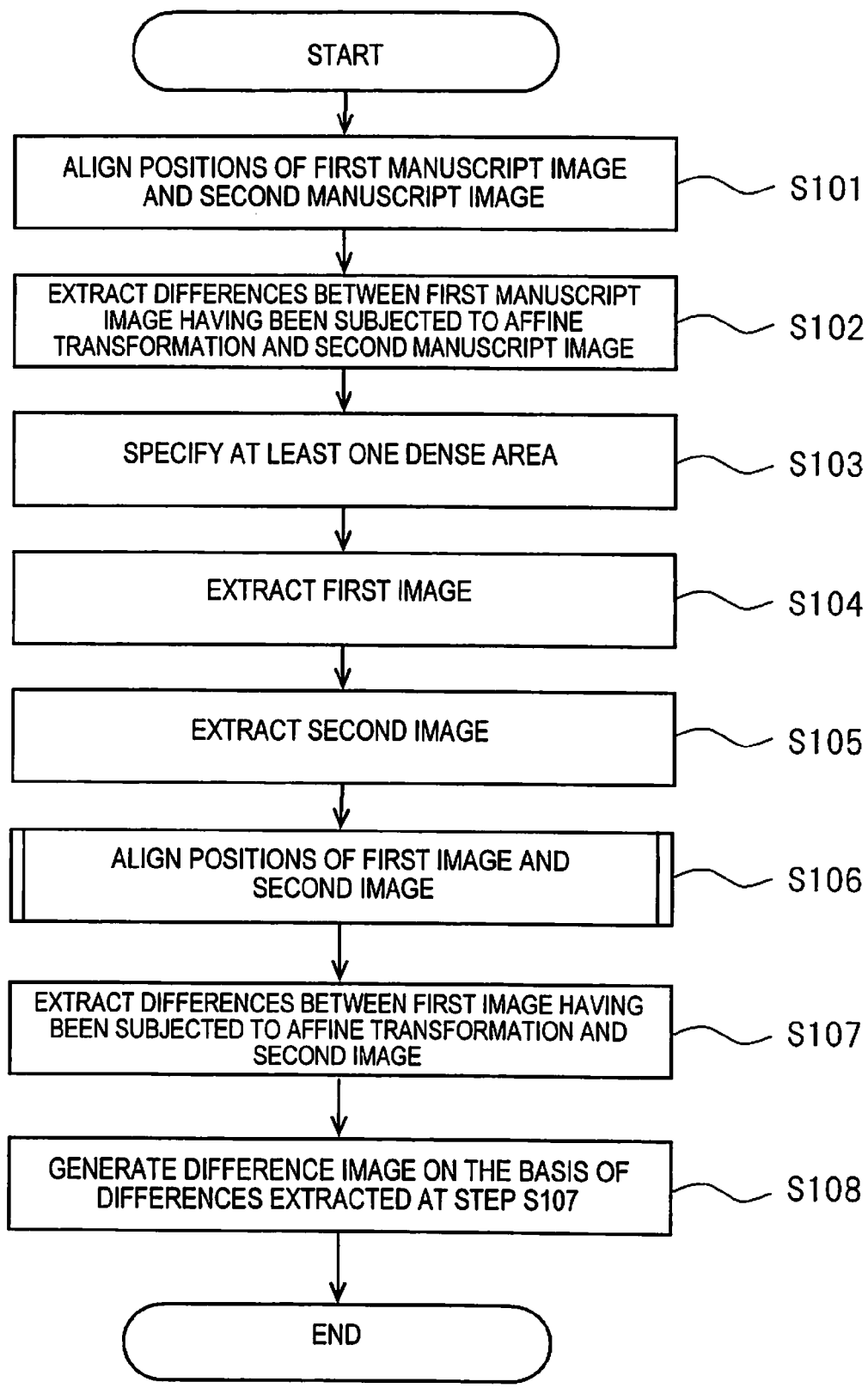
FIG. 3 is a flowchart showing an example of processing executed by the information processor according to the exemplary embodiment of the present invention.

FIG. 3 is a flowchart showing an example of processing executed by the information processor 2. This processing is executed when the control section 4 operates according to the above-mentioned programs. In this exemplary embodiment, the processing is executed when the user performed predetermined operations.

First, the control section 4 (basic position aligning section) aligns the positions of the first manuscript image and the second manuscript image (at step S101). In this exemplary embodiment, the control section 4 aligns the positions of the first manuscript image and the second manuscript image by subjecting the first manuscript image to affine transformation (geometric transformation).

Four parameters used for affine transformation, $\Delta X$ (displacement in the X-direction), $\Delta Y$ (displacement in the Y-direction), $\theta$ (rotation angle) and $\beta$ (magnification ratio), are obtained, for example, as described below.

That is to say, the control section 4 obtains positions of the three reference images (for example, the images of markers previously described on a manuscript) in the first manuscript image and the positions of the three reference images in the second manuscript image. Then, the control section 4 obtains the differences between the positions of the reference images in the first manuscript image and the positions of the reference images in the second manuscript image, and then obtains the above-mentioned parameters based on the difference obtained for each reference image.

Any interpolation method may be used as the interpolation method that is used for affine transformation. In this exemplary embodiment, when the first manuscript image and the second manuscript image are binary images, the nearest neighbor method is used. In the case that the first manuscript image and the second manuscript image are images other than binary images, that is, gray images and color images, the bicubic method is used.

After aligning the positions of the first manuscript image and the second manuscript image, the control section 4 extracts the differences between the first manuscript image having been subjected to affine transformation and the second manuscript image (at step S102). In this exemplary embodiment, the control section 4 subtracts the binary image of the second manuscript image from the binary image of the first manuscript image having been subjected to affine transformation. When the binary image of the second manuscript image is subtracted from the binary image of the first manuscript image having been subjected to affine transformation, the black pixels of the binary image of the second manuscript image may be expanded.

Furthermore, the control section 4 specifies at least one dense area based on the extraction result of the differences between the first manuscript image having been subjected to affine transformation and the second manuscript image (at step S103). In this exemplary embodiment, the control section 4 specifies at least one dense area in which the pixels (hereafter described as "extracted pixels") extracted by subtracting the binary image of the second manuscript image from the binary image of the first manuscript image having been subjected to affine transformation are densely concentrated. For example, the control section 4 calculates the distance between the extracted pixels adjacent to each other and specifies the dense areas on the basis of the result of the calculation.

Then, the control section 4 executes the processes of steps S104 to S107 for each dense area.

In other words, the control section 4 extracts a first image serving as an image inside a circumscribed rectangular area enclosed within the circumscribed rectangle of the dense area from the second manuscript image (at step S104) and stores the image in the main storage section 6.

Figure 4A:
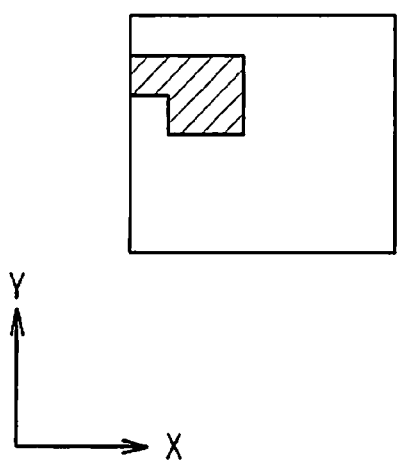
FIG. 4A is a view showing an example of a first image.
Figure 4B:
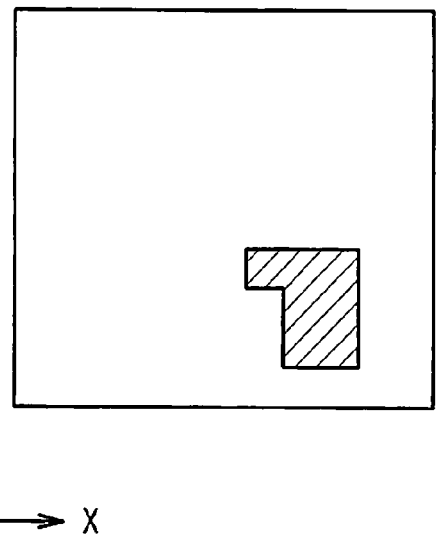
FIG. 4B is a view showing an example of a second image.

In addition, the control section 4 extracts a second image serving as an image inside an expansion area obtained by expanding the above-mentioned circumscribed rectangular area by a predetermined size from the first manuscript image having been subjected to affine transformation (at step S105) and stores the image in the main storage section 6. FIGS. 4A and 4B are views showing examples of the first and second images; FIG. 4A shows the first image, and FIG. 4B shows the second image.

Figure 5:
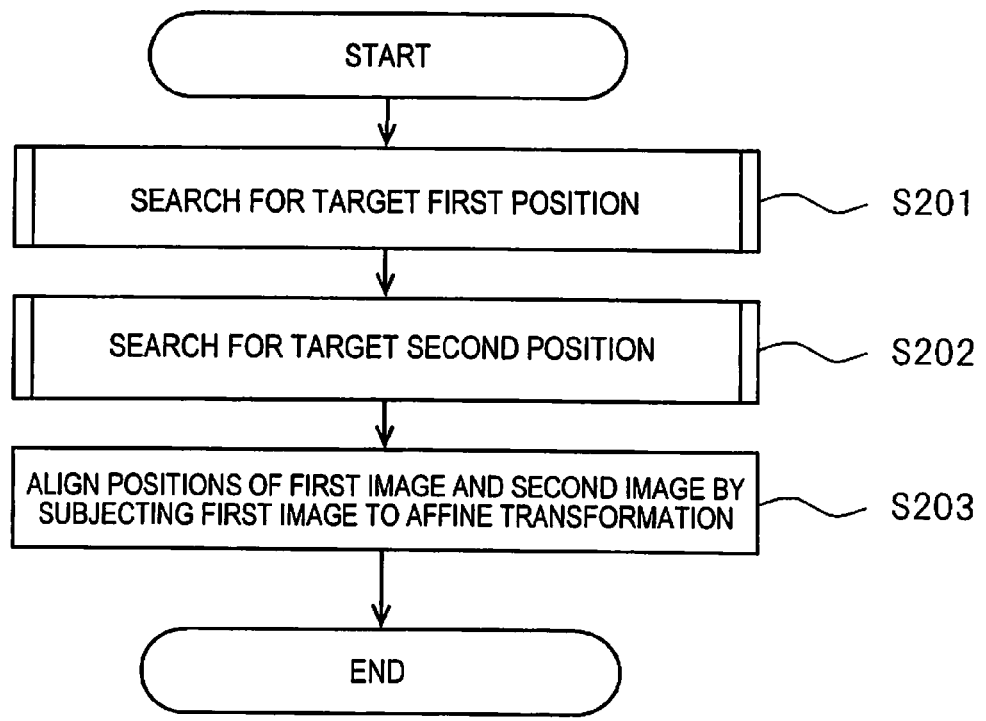
FIG. 5 is a flowchart showing another example of processing executed by the information processor according to the exemplary embodiment of the present invention.

Then, the control section 4 executes the processing shown in FIG. 5 to align the positions of the first image and the second image (at step S106).

First, at step S201, the control section 4 actually moves the first image to multiple positions and searches for a position in which the first image having been moved is most similar to the second image. In this exemplary embodiment, the control section 4 actually moves the first image to each of multiple movement destination candidate positions (hereafter described as "first positions") of the first image and searches for a target first position in which the first image having been moved is most similar to the second image (at step S201).

Figure 6:
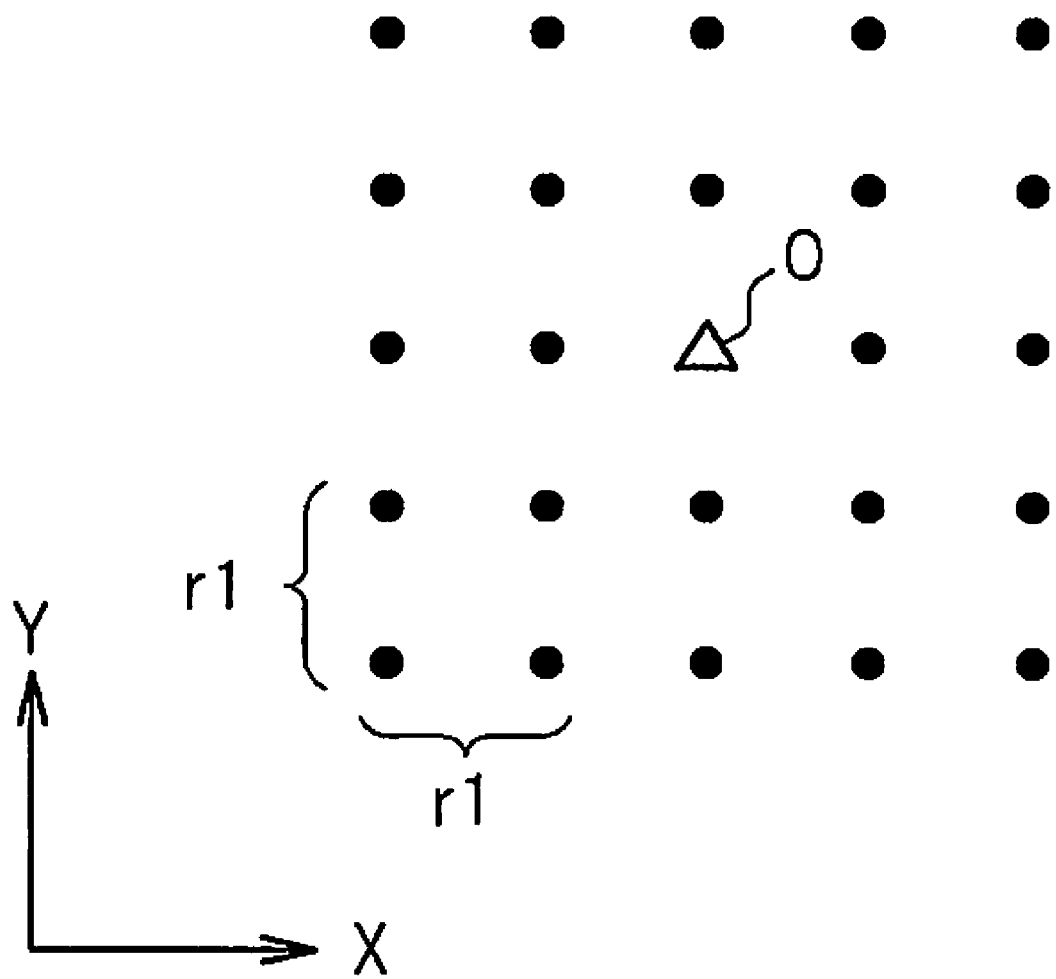
FIG. 6 is a view showing first positions.

FIG. 6 is a view showing first positions $P_i$ (i=1 to E1 (=24)). In the figure, the triangular mark indicates the position O of the first image, and the circular marks indicate the first positions $P_i$. As shown in the figure, the 24 first positions $P_i$ are each located away from the position O of the first image by "N(N=0, 1, 2)·first distance r1 (reference distance)" in one of the X-direction (reference direction) and the Y-direction (reference direction) and also away from the position O by "M(M=1, 2)·first distance r1" in the other of the X-direction and the Y-direction. It is herein assumed that the first distance r1 is the distance amounting to one pixel. The total number E1 of the first positions $P_i$ may not be 24.

Figure 7:
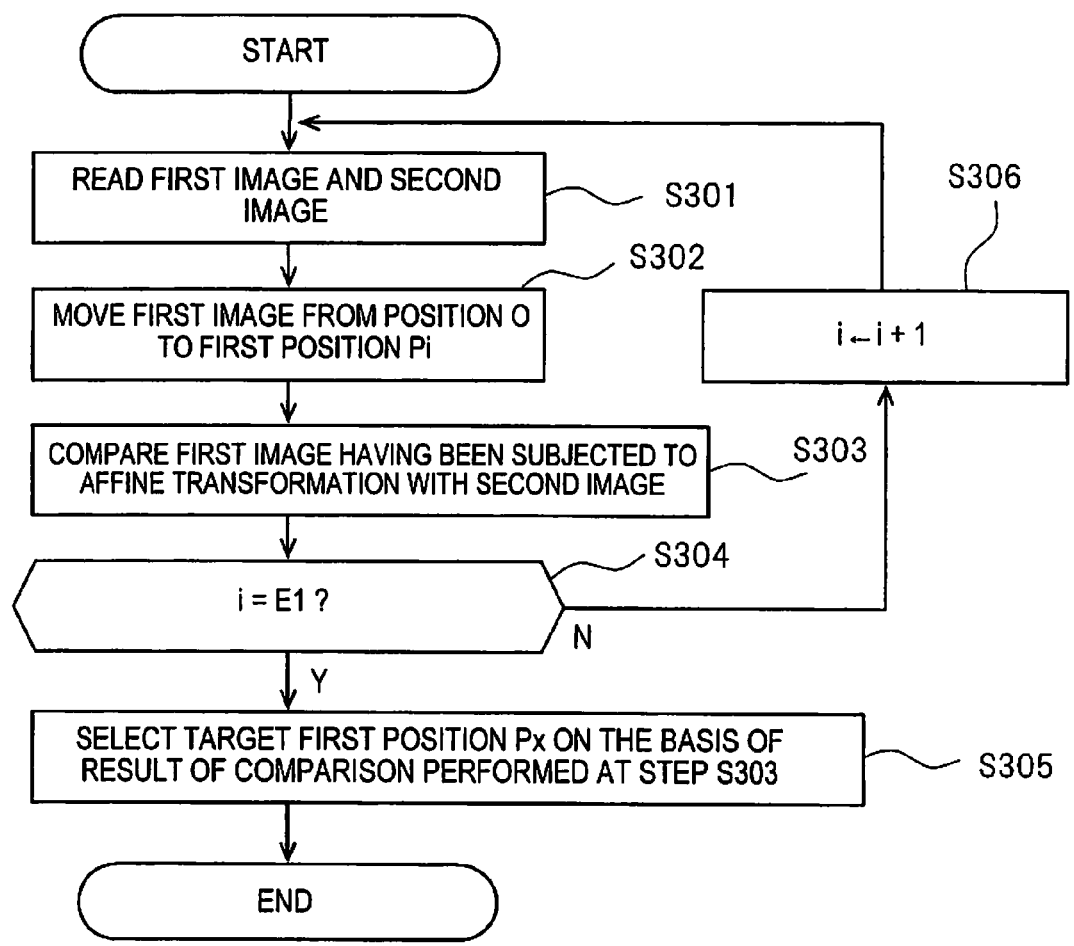
FIG. 7 is a flowchart showing still another example of processing executed by the information processor according to the exemplary embodiment of the present invention.

In this exemplary embodiment, in the case of searching for the target first position, the control section 4 (first movement control section) first reads the first image and the second image from the main storage section 6 (at step S301) as shown in FIG. 7.

Then, the control section 4 moves the first image from the position O to the second position $P_i$ by performing affine transformation (geometric transformation) for the first image having been read at step S301 (at step S302). First, the control section 4 moves the first image from the position O to the first position $P_{i=1}$.

For example, in the case that the displacement of the first position $P_i$ from the position O in the X-direction amounts to n pixels and that the displacement of the first position $P_i$ from the position O in the Y-direction amounts to m pixels, the control section 4 sets the arguments of the parameters $\Delta X$, $\Delta Y$, $\theta$ and $\beta$ to "n", "m", "0" and "1", respectively, and subjects the first image to affine transformation. Any interpolation method may be used as the interpolation method that is used for affine transformation. In this exemplary embodiment, the same interpolation method as the interpolation method used at step S101 is used.

Then, the control section 4 (first comparing section) compares the first image having been subjected to affine transformation at step S302 with the second image (at step S303). In this exemplary embodiment, the control section 4 obtains the similarity S (the result of the comparison) between the first image having been subjected to affine transformation at step S302 and the second image. The obtaining of the similarity S (corresponding to the degree of matching) is performed in a manner similar to the technology disclosed in Japanese Patent Application Laid-open Publication No. 2007-241356.

For example, in the case that first image and the second image are binary images, the control section 4 obtains the number of pixels having the same pixel values as the similarity S when the first image having been subjected to affine transformation at step S302 was overlaid on the second image.

In addition, for example, in the case that the first image and the second image are gray images, the control section 4 obtains the number of pixels in which the differences between the pixel values thereof have a predetermined threshold value or less as the similarity S when the first image having been subjected to affine transformation at step S302 was overlaid on the second image.

Furthermore, for example, in the case that the first image and the second image are color images, the control section 4 obtains the number of pixels whose Euclidean distances in the RGB space have a predetermined value or less as the similarity S when the first image having been subjected to affine transformation at step S302 was overlaid on the second image.

Moreover, the control section 4 judges whether the first image has been moved to all the first positions $P_i$ and the process of step S303 has been executed, that is, whether "i=E1" is fulfilled (at step S304). In the case of "i≠E1" (N at step S304), the control section 4 increments "i" by one (at step S306), and the processing returns to step S301.

On the other hand, in the case of "i=E1" (Y at step S304), the control section 4 (target first position selecting section) selects a target first position Px from among all the first positions $P_i$ on the basis of the result of the comparison performed at step S303 (at step S305) In this exemplary embodiment, the control section 4 selects the first position $P_i$ in which the highest similarity S was obtained as the target first position Px.

In this way, the control section 4 searches for the target first position Px.

The control section 4 may indirectly move the first image from the position O to the first position $P_i$ (i≧2) at step S302 by subjecting "the first image having been moved to the first position $P_{i-1}$ as the result of the previous step S302" to affine transformation. In this case, affine transformation is eventually performed multiple times to move the first image to the first position $P_i$. However, the image quality of "the first image having been moved to the first position $P_i$" in this case is more degraded than the image quality in the case that the first image is moved from the position O to the first position $P_i$ by performing affine transformation once. In other words, the degradation of the image quality of "the first image having been moved to the first position $P_i$" in the case that the first image is moved from the position O to the first position $P_i$ by performing affine transformation once is more suppressed than the degradation in the case that the first image is moved from the position O to the first position $P_i$ by performing affine transformation multiple times. For this reason, the accuracy of the comparison at step S303 in the case that the first image is moved from the position O to the first position $P_i$ by performing affine transformation once becomes higher than the accuracy in the case that the first image is moved from the position O to the first position $P_i$ by performing affine transformation multiple times.

Furthermore, the first image subjected to affine transformation at step S302 is an image extracted from the second manuscript image not subjected to affine transformation at step S101. In other words, the first image is not an image extracted from the first manuscript image whose quality was degraded by performing affine transformation at step S101. Hence, the accuracy of the comparison at step S303 becomes higher than the accuracy in the case that the first image is extracted from the first manuscript image having been subjected to affine transformation at step S101.

Furthermore, the same interpolation method as the interpolation method used at step S101 is used at step S302. In this respect, the accuracy of the comparison at step S303 also becomes higher.

When the target first position Px is selected, the control section 4 actually moves the first image from the position O to the periphery of the target first position Px this time and searches for a position in which the first image having been moved is most similar to the second image at step S202. In this exemplary embodiment, the control section 4 actually moves the first image to each of multiple movement destination candidate positions (hereafter described as "second positions") in the periphery of the target first position Px and searches for a target second position in which the first image having been moved is most similar to the second image from among the multiple second positions (at step S202).

Figure 8:
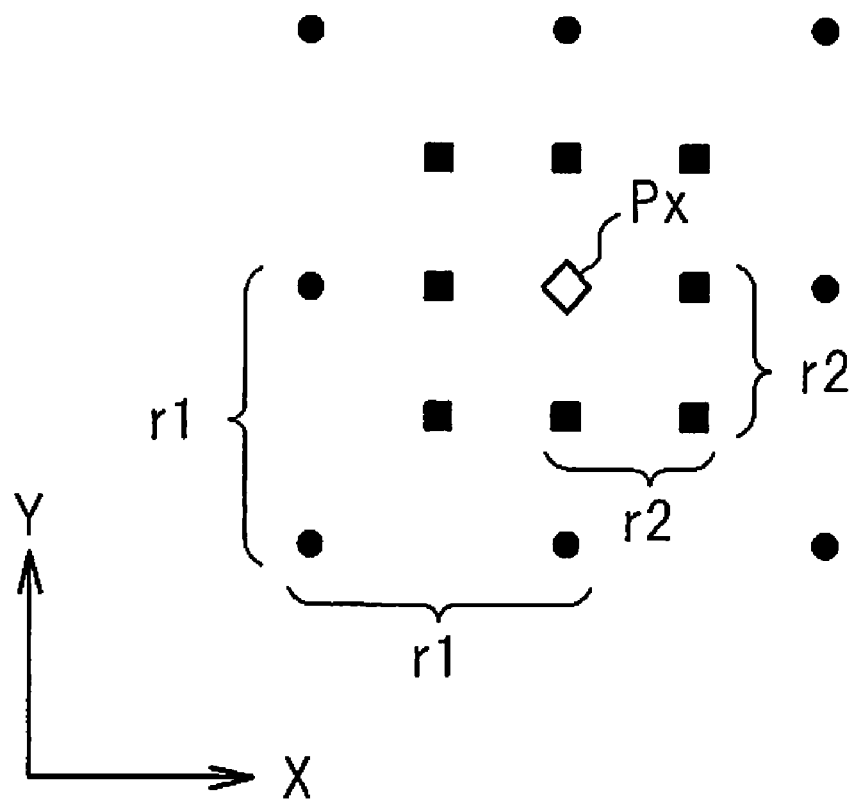

FIG. 8 is a view showing second positions $Q_i$ (i=1 to E2 (=8)). In the figure, the rhombic mark indicates the target first position Px, the circular marks indicate the first positions $P_i$ in the periphery of the target first position Px, and the rectangular marks indicate the second positions $Q_i$. As shown in the figure, the 8 second positions $Q_i$ are each located away from the target first position Px by "N(N=0, 1)·second distance r2" in one of the X-direction (reference direction) and the Y-direction (reference direction) and also away from the target first position Px by "M(M=1)·second distance r2" in the other of the X-direction and the Y-direction. The second distance r2 is herein a distance smaller than the first distance r1. It is herein assumed that the second distance r2 is the distance amounting to half of one pixel. The total number E2 of the second position $Q_i$ may not be 8.

Figure 9:
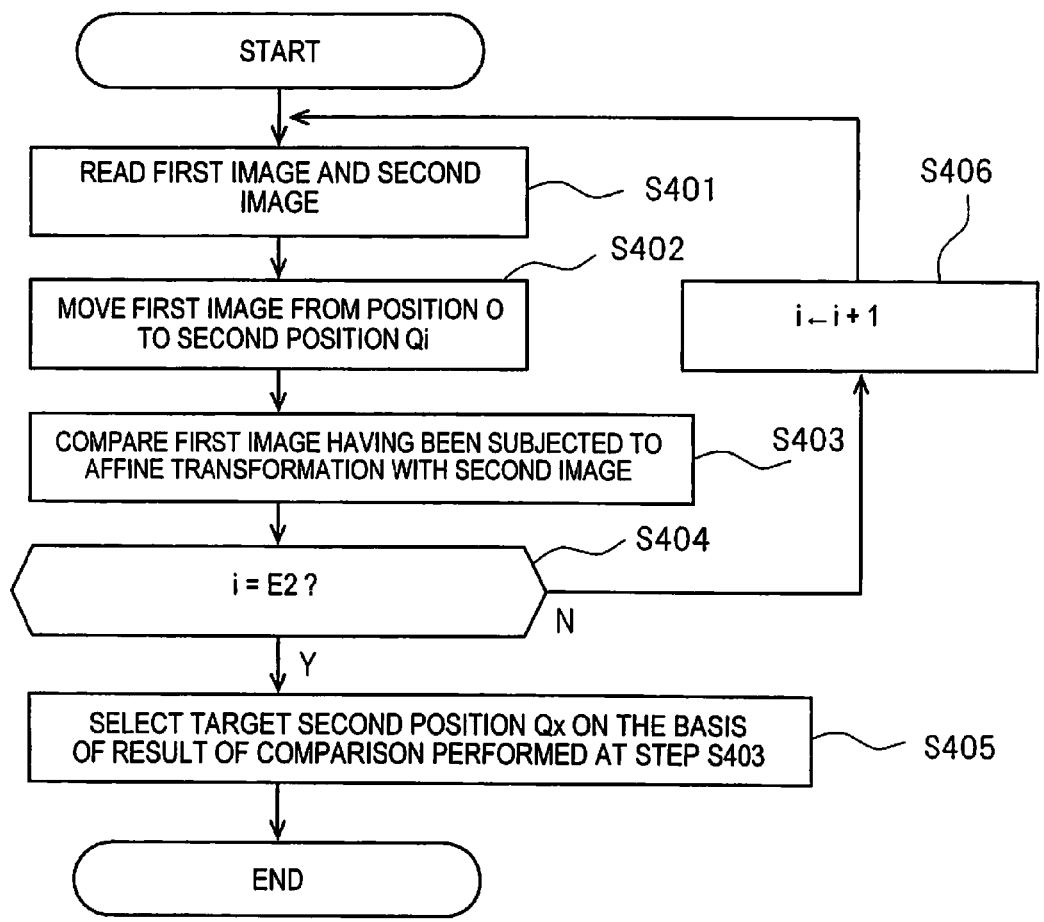
FIG. 9 is a flowchart showing yet still another example of processing executed by the information processor according to the exemplary embodiment of the present invention.

In this exemplary embodiment, in the case of searching for the target second position, the control section 4 (second movement control section) first reads the first image and the second image from the main storage section 6 (at step S401) as shown in FIG. 9.

Then, the control section 4 moves the first image from the position O to the second position $Q_i$ by performing affine transformation (geometric transformation) for the first image having been read at step S401 (at step S402). First, the control section 4 moves the first image from the position O to the second position $Q_{i=1}$.

For example, in the case that the displacement of the second position $Q_i$ from the position O in the X-direction amounts to n pixels and that the displacement of the second position $Q_i$ from the position O in the Y-direction amounts to m pixels, the control section 4 sets the arguments of the parameters $\Delta X$, $\Delta Y$, $\theta$ and $\beta$ to "n", "m", "0" and "1", respectively, and subjects the first image to affine transformation. Any interpolation method may be used as the interpolation method that is used for affine transformation. In this exemplary embodiment, the same interpolation method as the interpolation method used at step S101 is used.

Then, the control section 4 (second comparing section) compares the first image having been subjected to affine transformation at step S402 with the second image (at step S403). In this exemplary embodiment, the control section 4 obtains the similarity S (the result of the comparison) between the first image having been subjected to affine transformation at step S402 and the second image. The calculation of the similarity S is performed in a manner similar to the process of step S303.

Moreover, the control section 4 judges whether the first images has been moved to all the second positions $Q_i$ and the process of step S403 has been executed, that is, whether "i=E2" is fulfilled (at step S404). In the case of "i≠E2" (N at step S404), the control section 4 increments "i" by one (at step S406), and the processing returns to step S401.

On the other hand, in the case of "i=E2" (Y at step S404), the control section 4 (target second position selecting section) selects a target second position Qx from among all the second positions $Q_i$ on the basis of the result of the comparison at step S403 (at step S405). In this exemplary embodiment, the control section 4 selects the second position $Q_i$ in which the highest similarity S was obtained as the target second position Qx.

In this way, the control section 4 searches for the target second position Qx.

The control section 4 may indirectly move the second image from the position O to the second position $Q_i$ ($i \geq 2$) at step S402 by subjecting "the first image having been moved to the second position $Q_{i-1}$ as the result of the previous step S402" to affine transformation. In this case, affine transformation is eventually performed multiple times to move the first image to the second position $Q_i$. However, the image quality of "the first image having been moved to the second position $Q_i$" in this case is more degraded than the image quality in the case that the first image is moved from the position O to the second position $Q_i$ by performing affine transformation once. In other words, the degradation of the image quality of "the first image having been moved to the second position $Q_i$" in the case that the first image is moved from the position O to the second position $Q_i$ by performing affine transformation once is more suppressed than the degradation in the case that the first image is moved from the position O to the second position $Q_i$ by performing affine transformation multiple times. For this reason, the accuracy of the comparison at step S403 in the case that the first image is moved from the position O to the second position $Q_i$ by performing affine transformation once becomes higher than the accuracy in the case that the first image is moved from the position O to the second position $Q_i$ by performing affine transformation multiple times.

Furthermore, the first image subjected to affine transformation at step S402 is an image extracted from the second manuscript image not subjected to affine transformation at step S101. In other words, the first image is not an image extracted from the first manuscript image whose quality was degraded by performing affine transformation at step S101. Hence, the accuracy of the comparison at step S403 becomes higher than the accuracy in the case that the first image is extracted from the first manuscript image having been subjected to affine transformation at step S101.

Furthermore, the same interpolation method as the interpolation method used at step S101 and step S302 is used at step S402. In this respect, the accuracy of the comparison at step S403 also becomes higher.

When the target second position Qx is selected, the control section 4 (position aligning section) aligns the position of the first image stored in the main storage section 6 with the position of the second image stored in the main storage section 6 (at step S203). More specifically, in the case that the displacement of the target second position Qx from the position O in the X-direction is "x" and that the displacement of the target second position Qx from the position O in the Y-direction is "y", the control section 4 sets the arguments of the parameters $\Delta X$, $\Delta Y$, $\theta$ and $\beta$ to "x", "y", "0" and "1", respectively, and subjects the first image to affine transformation. Any interpolation method may be used as the interpolation method that is used for affine transformation. In this exemplary embodiment, the same interpolation method used at step S101 is used to improve the accuracy of the position alignment.

After aligning the position of the first image with the position of the second image at step S106, the control section 4 extracts the differences between the first image having been subjected to affine transformation and the second image (at step S107).

For example, in the case that the first image and the second image are binary images, the control section 4 subtracts the second image whose black pixels were expanded from the first image having been subjected to affine transformation, and subtracts the first image whose black pixels were expanded and which was subjected to affine transformation from the second image.

Furthermore, for example, in the case that the first image and the second image are gray images, the control section 4 subtracts the second image from the first image having been subjected to affine transformation to extract pixels, the absolute values of the density differences of which are a predetermined value or more. However, the control section 4 may execute processing for removing noise (for example, contraction processing) after extracting pixels, the absolute values of the density differences of which are the predetermined value or more.

Furthermore, for example, in the case that the first image and the second image are color images, the control section 4 compares the first image having been subjected to affine transformation with the second image and extracts pixels whose Euclidean distances in the Lab space have a predetermined value or less.

Figure 10:
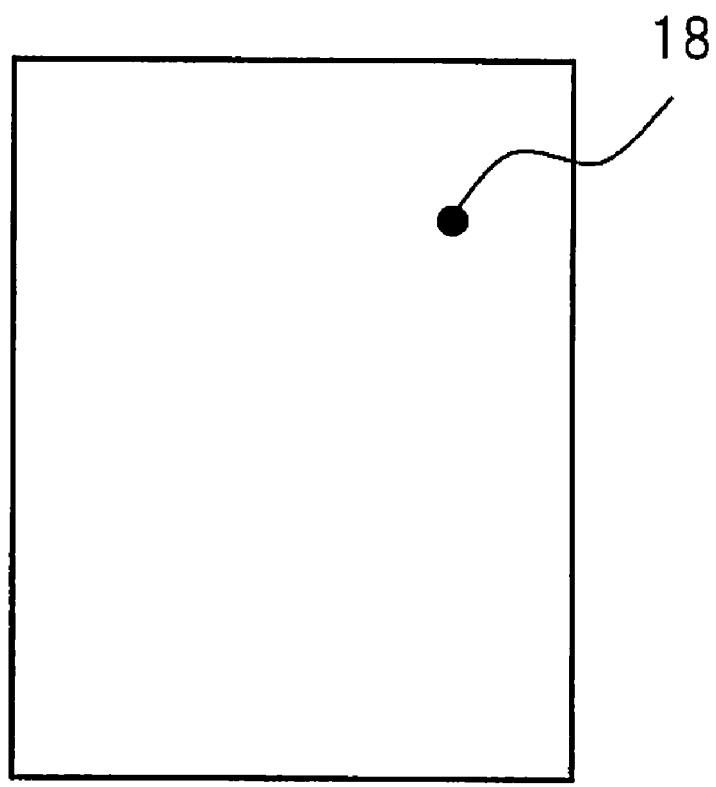
FIG. 10 is a view showing an example of a difference image.

After executing the processes of steps S104 to S107 for each dense area, the control section 4 generates a difference image (see FIG. 10) showing the differences between the manuscript X and the manuscript Y (in other words, additional portions or white-painted portions added to the manuscript X) on the basis of the differences extracted at step S107 (at step S108). The difference image is shown on the display section 12.

[3. Function Block]

Figure 11:
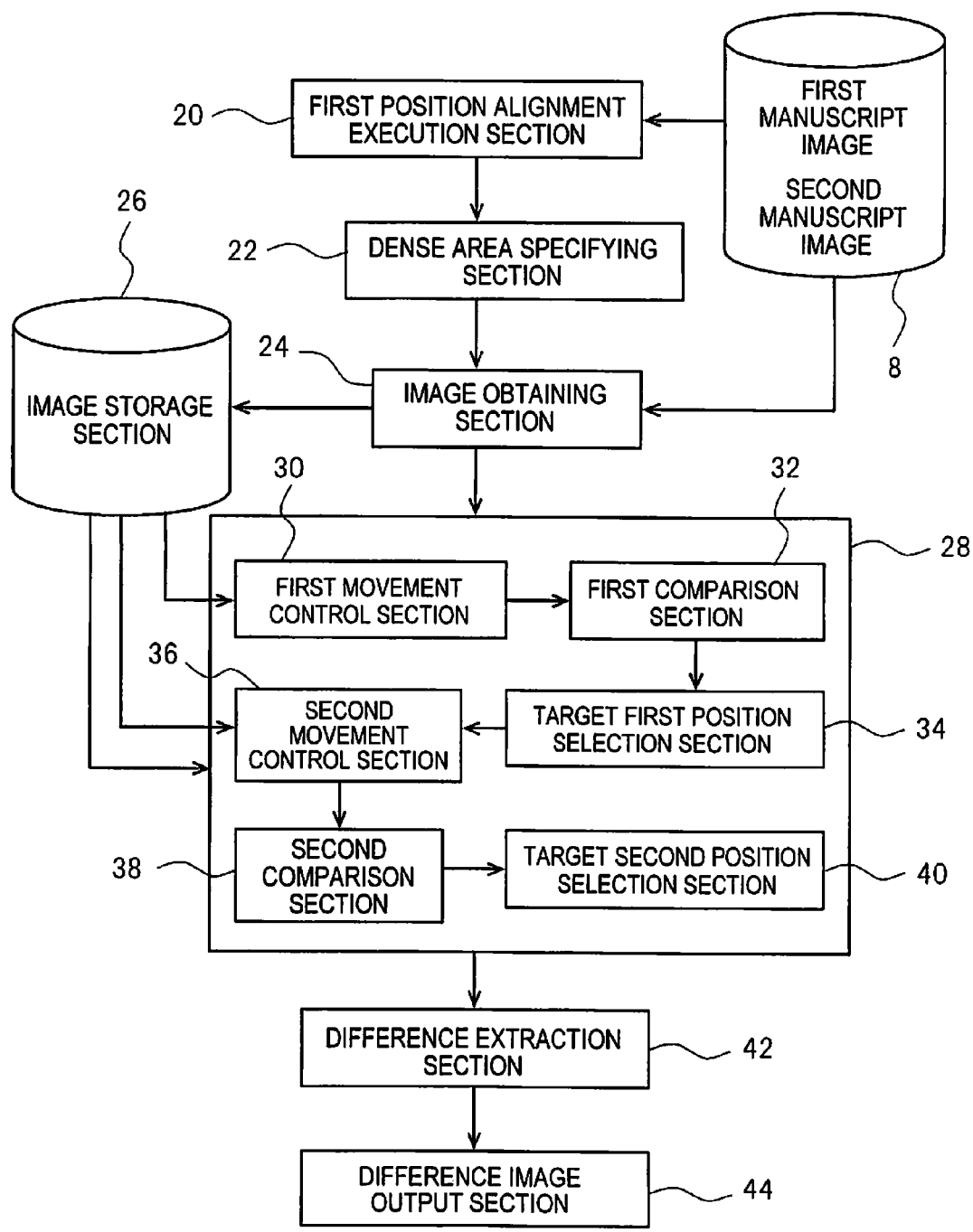
FIG. 11 is a diagram showing functional blocks achieved by the information processor according to the exemplary embodiment of the present invention.

FIG. 11 is a functional block diagram showing functional blocks achieved by the information processor 2. As shown in the figure, the information processor 2 contains a first position alignment execution section 20, a dense area specifying section 22, an image obtaining section 24, an image storage section 26, a second position alignment execution section 28, a difference extraction section 42, and a difference image output section 44. The functions of these sections are achieved when the control section 4 operates according to the above-mentioned programs.

[First Position Alignment Execution Section]

The first position alignment execution section 20 is mainly achieved by the control section 4. The first position alignment execution section 20 aligns the positions of the first manuscript image and the second manuscript image by subjecting the first manuscript image to affine transformation (at step S101 in FIG. 3).

[Dense Area Specifying Section]

The dense area specifying section 22 is mainly achieved by the control section 4. The dense area specifying section 22 specifies at least one of the above-mentioned dense areas on the basis of the extraction result of the differences between the first manuscript image having been subjected to affine transformation and the second manuscript image (at step S102 and step S103 in FIG. 3).

[Image Obtaining Section]

The image obtaining section 24 is mainly achieved by the control section 4. For each dense area, the image obtaining section 24 obtains the first image corresponding to the dense area and the second image corresponding to the dense area, and stores these images in the image storage section 26.

For example, in the case of obtaining the first image corresponding to a dense area X and the second image corresponding to the dense area X, the image obtaining section 24 obtains the image inside the above-mentioned circumscribed rectangular area based on the dense area X as the first image from one of the first manuscript image having been subjected to affine transformation and the second image. Furthermore, the image obtaining section 24 obtains the image inside the above-mentioned expansion area based on the dense area X as the second image from the other of the first manuscript image having been subjected to affine transformation and the second image.

In this exemplary embodiment, the image obtaining section 24 obtains the image inside the above-mentioned circumscribed rectangular area as the first image from the second manuscript image (at step S104 in FIG. 3). Furthermore, the image obtaining section 24 obtains the image inside the above-mentioned expansion area as the second image from the first manuscript image having been subjected to affine transformation.

[Image Storage Section]

The image storage section 26 is mainly achieved by the main storage section 6. The image storage section 26 stores the first image and the second image.

[Second Position Alignment Execution Section]

The second position alignment execution section 28 is mainly achieved by the control section 4. The second position alignment execution section 28 contains a first movement control section 30, a first comparison section 32, a target first position selection section 34, and a second movement control section 36, a second comparison section 38, and a target second position selection section 40. The second position alignment execution section 28 aligns the position of the first image corresponding to the dense area with the position of the second image corresponding to the dense area (at step S106 in FIG. 3).

The alignment of the position of the first image corresponding to the dense area X with the position of the second image corresponding to the dense area X will be described below.

[First Movement Control Section]

To perform the alignment, the first movement control section 30 sequentially moves the first image from the position O to the respective first positions $P_i$ by repeatedly performing affine transformation for the first image (at step S302 in FIG. 7). For example, in the case of moving the first image from the position O to the first position $P_{i=x}$, the first movement control section 30 reads the first image from the image storage section 26 (at step S301 in FIG. 7) and moves the read first image from the position O to the first position $P_{i=x}$ by performing affine transformation once for the first image (at step S302 in FIG. 7).

[First Comparison Section]

Each time the first image is moved to the first position $P_i$, the first comparison section 32 compares "the first image having been moved to the first position $P_i$" with the second image stored in the image storage section 26 and obtains the similarity S (the result of the comparison) (at step S303 in FIG. 7).

[Target First Position Selection Section]

Then, the target first position selection section 34 selects the target first position Px on the basis of the similarity S obtained using the first comparison section 32 (at step S305 in FIG. 7). More specifically, the target first position selection section 34 selects the first position $P_i$ in which the highest similarity S was obtained, as the target first position Px.

[Second Movement Control Section]

When the target first position Px is selected, the second movement control section 36 sequentially moves the first image from the position O to the respective second positions $Q_i$ by repeatedly performing affine transformation for the first image (at step S402 in FIG. 9). For example, in the case of moving the first image from the position O to the second position $Q_{i=x}$, the second movement control section 36 reads the first image from the image storage section 26 (at step S401 in FIG. 9) and moves the read first image from the position O to the second position $Q_{i=x}$ by performing affine transformation once for the first image (at step S402 in FIG. 9).

[Second Comparison Section]

Each time the first image is moved to the second position $Q_i$, the second comparison section 38 compares "the first image having been moved to the second position $Q_i$" with the second image to be stored in the image storage section 26 and obtains the similarity S (the result of the comparison) (at step S403 in FIG. 9).

[Target Second Position Selection Section]

Then, the target second position selection section 40 selects the target second position Qx on the basis of the similarity S obtained using the second comparison section 38 (at step S405 in FIG. 9). More specifically, the target second position selection section 40 selects the second position $Q_i$ in which the highest similarity S was obtained, as the target second position Qx.

When the target second position Qx is selected as described above, the second position alignment execution section 28 aligns the positions of the first image and the second image by subjecting the first image to affine transformation (at step S203 in FIG. 5). More specifically, in the case that the displacement of the target second position Qx from the position O in the X-direction is "x" and that the displacement of the target second position Qx from the position O in the Y-direction is "y", the second position alignment execution section 28 sets the arguments of the parameters $\Delta X$, $\Delta Y$, $\theta$ and $\beta$ to "x", "y", "0" and "1", respectively, and subjects the first image to affine transformation.

[Difference Extraction Section]

The difference extraction section 42 is mainly achieved by the control section 4. The difference extraction section 42 extracts the differences between the first image having been subjected to affine transformation using the second position alignment execution section 28 and the second image (at step S107 in FIG. 3).

[Difference Image Output Section]

The difference image output section 44 is mainly achieved by the control section 4. The difference image output section 44 generates a difference image (see FIG. 10) on the basis of the differences extracted using the difference extraction section 42. The difference image is shown on the display section 12 (at step S108 in FIG. 3).

[4. Summary]

In the above-mentioned information processor 2, the target first position Px in which the highest similarity S is obtained between the first image and the second image is searched for from among the multiple first positions $P_i$ disposed at equal intervals, and then the target second position Qx in which the highest similarity S is obtained between the first image and the second image is searched for from among the multiple second positions $Q_i$ disposed at intervals smaller than those of the first positions $P_i$. For this reason, the accuracy of the position alignment between the first image and the second image is improved in the information processor 2.

[5. Modification Examples]

It is to be understood that the present invention is not limited to the exemplary embodiment described above.

[Modification Example 1]

For example, in the case that the first image and the second image are color images, it may be possible that the control section 4 subjects the first image and the second image to gray-scale transformation and stores the transformed images in the main storage section 6. In this case, the control section 4 executes the process of step S201 and the process of step S202 for the first image having been subjected to gray-scale transformation and the second image having been subjected to gray-scale transformation. After the above-mentioned processing, it may be possible that the control section 4 performs the processes of steps S106 to S108 for the first image not subjected to gray-scale transformation (in other words, the first image itself) and the second image not subjected to gray-scale transformation (in other words, the second image itself), instead of the first image having been subjected to gray-scale transformation and the second image having been subjected to gray-scale transformation.

[Modification Example 2]

In addition, for example, it may be possible that, before the processing advances to step S203 after the target second position Qx was selected at step S202, the control section 4 further searches for the parameter θ (rotation angle) and the parameter β (magnification ratio) to raise the accuracy of the position alignment between the first image and the second image. This mode will be described below. In the following description, it is assumed that the displacement of the target second position Qx from the position O in the X-direction is "x" and that the displacement of the target second position Qx from the position O in the Y-direction is "y".

Figure 12:
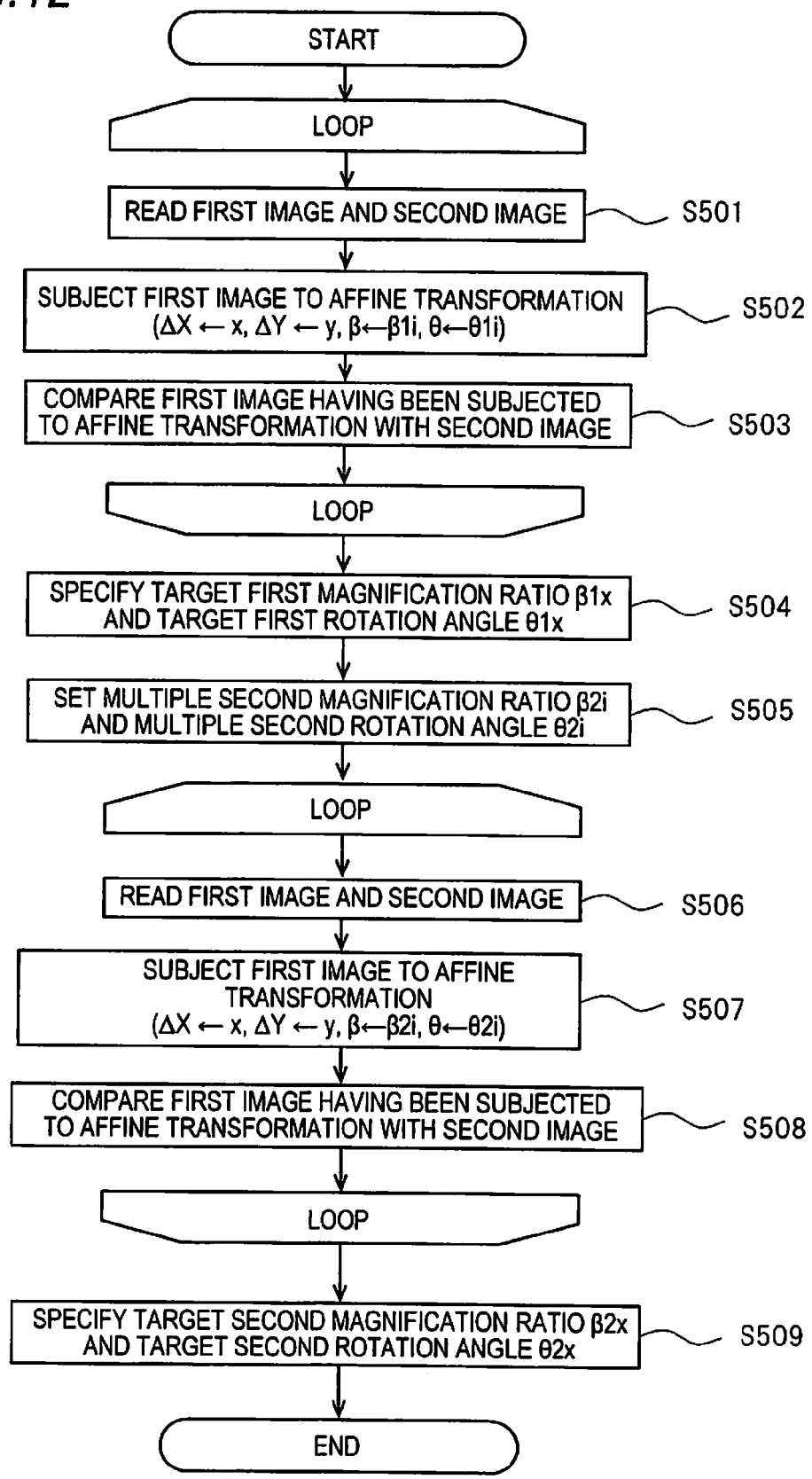
FIG. 12 is a flowchart showing a further example of processing executed by the information processor according to the exemplary embodiment of the present invention.

FIG. 12 shows processing to be executed by the information processor 2 when the parameter θ (rotation angle) and the parameter β (magnification ratio) are searched for.

In this mode, the control section 4 searches for a combination in which the similarity S becomes highest from each combination of any one of multiple candidates $β1_i$ (hereafter described as "first magnification ratios $β1_i$") of the parameter β and any one of multiple candidates $θ1_i$ (hereafter described as "first rotation angles $θ1_i$") of the parameter θ by executing the processes of steps S501 to S504. It is herein assumed that the respective magnification ratios $β1_i$ are four magnification ratios, "0.8", "0.9", "1.1" and "1.2", integral multiples of Δβ1 (=0.1, the difference between the magnification ratio $β1_i$ and the magnification ratio "1"). Furthermore, it is also herein assumed that the respective rotation angle $θ1_i$ are four rotation angles, "1°", "2°", "−1°" and "−2°", integral multiples of Δθ1 (=1°, the difference between the rotation angle $θ1_i$ and the rotation angle "0°").

First, the control section 4 (magnifying section, rotating section and third comparing section) executes the processes of step S501 and step S503 for each combination of the first magnification ratio $β1_i$ and the first rotation angle $θ1_i$.

In other words, the control section 4 reads the first image and the second image from the main storage section 6 (at step S501).

Then, the control section 4 (magnifying section and rotating section) sets the arguments of the parameters ΔX, ΔY, θ and β to "x", "y", "$β1_i$" and "$θ1_i$", respectively, and subjects the first image to affine transformation (at step S502). Hence, the control section 4 rotates and magnifies the first image while moving the first image from the position O to the target second position Qx. However, instead of subjecting the first image to affine transformation, the control section 4 may further subject "the first image having been subjected to affine transformation at step S502" to affine transformation.

In addition, the control section 4 (third comparing section) compares the first image having been subjected to affine transformation at step S502 with the second image (at step S503) and calculates the similarity S (the result of the comparison). The calculation of the similarity S is performed in a manner similar to the processes of step S303 and step S403.

Furthermore, the control section 4 specifies the combination of the first magnification ratio $β1_i$ and the first rotation angle $θ1_i$ in which the highest similarity S was obtained (at step S504). The first magnification ratio $β1_i$ and the first rotation angle $θ1_i$ constituting the combination specified herein are hereafter referred to as "target first magnification ratio β1x" and "target first rotation angle θ1x", respectively.

Moreover, the control section 4 further searches for parameters θ (rotation angles) and parameters β (magnification ratios) at steps S504 to S509.

In other words, the control section 4 sets multiple second magnification ratios $β2_i$ on the basis of the target first magnification ratio β1x and sets multiple second rotation angles $θ2_i$ on the basis of the target first rotation angle θ1x (at step S505). More specifically, the control section 4 sets two magnification ratios "β1x−0.05" and "β1x+0.05", in which the difference from the target first magnification ratio β1x is Δβ2 (=0.05) that is smaller than Δβ1 (=0.1), as second magnification ratios $β2_i$. For example, in the case that β1x is "1.1", the two second magnification ratios $β2_i$ are "1.05" and "1.15", respectively. Furthermore, the control section 4 sets two rotation angles "θ1x−0.5" and "θ1x+0.5", in which the difference from the target first rotation angle θ1x is Δθ2 (=0.5°) that is smaller than Δθ1 (=1°), as second rotation angles $θ2_i$. For example, in the case that θ1x is "1°", the two second rotation angles $θ2_i$ are "0.5°" and "1.5°", respectively.

Then, the control section 4 (magnifying section, rotating section and third comparing section) executes the processes of step S506 and step S508 for each combination of the second magnification ratio $β2_i$ and the second rotation angle $θ2_i$.

In other words, the control section 4 reads the first image and the second image from the main storage section 6 (at step S506).

Then, the control section 4 (magnifying section and rotating section) sets the arguments of the parameters $\Delta X$, $\Delta Y$, $\theta$ and $\beta$ to "x", "y", "$\beta 2_i$," and "$\theta 2_i$,", respectively, and subjects the first image to affine transformation (at step S507). Hence, the control section 4 rotates and magnifies the first image while moving the first image from the position O to the target second position Qx. However, instead of subjecting the first image to affine transformation, the control section 4 may further subject "the first image having been subjected to affine transformation at step 507" to affine transformation.

In addition, the control section 4 (third comparing section) compares the first image having been subjected to affine transformation at step S507 with the second image (at step S508) and calculates the similarity S (the result of the comparison). The calculation of the similarity S is performed in a manner similar to the processes of step S303 and step S403.

Furthermore, the control section 4 (target magnification ratio selecting section and target rotation angle selecting section) specifies the combination of the second magnification ratio $\beta 2_i$ and the second rotation angle $\theta 2_i$ in which the highest similarity S was obtained (at step S509). The second magnification ratio $\beta 2_i$ and the second rotation angle $\theta 2_i$ constituting the combination specified herein are hereafter referred to as "target second magnification ratio $\beta 2x$" and "target second rotation angle $\theta 2x$", respectively.

After specifying the target second magnification ratio $\beta 2x$ and target second rotation angle $\theta 2x$, the control section 4 (position aligning section) sets the arguments of the parameters $\Delta X$, $\Delta Y$, $\theta$ and $\beta$ to "x", "y", "$\beta 2x$" and "$\theta 2x$", respectively, and subjects the first image to affine transformation (at step S203).

What is claimed is:

1. An information processor comprising:
   a processor that implements the functions of:
   a first movement control section that sequentially moves a first image from a reference position to multiple first positions, in which displacements in a reference direction between the reference position and the multiple first positions are multiples of a reference distance, by performing a first process including at least one geometric transformation process for the first image;
   a first comparing section that compares the first image having been subjected to the first process with a second image each time the first movement control section performs the first process;
   a target first position selecting section that selects a target first position from among the multiple first positions based on the comparison result of the first comparing section;
   a second movement control section that sequentially moves the first image from the reference position to multiple second positions, in which displacements in the reference direction between the target first position and the multiple second positions are smaller than the reference distance, by performing a second process including at least one geometric transformation process for the first image after the target first position is selected;
   a second comparing section that compares the first image having been subjected to the second process with the second image each time the second movement control section performs the second process;
   a target second position selecting section that selects a target second position from among the multiple second positions based on the comparison result of the second comparing section; and
   a position aligning section that aligns the positions of the first image and the second image by performing a geometric transformation process for the first image based on the difference between the reference position and the target second position.

2. The information processor according to claim 1, wherein the number of the at least one geometric transformation process included in the first process is one and, the number of the at least one geometric transformation process included in the second process is one.

3. The information processor according to claim 1, further comprising:
   a generating section that generates a gray image of the first image and a gray image of the second image when the first image and the second image are color images,
   wherein the process using the first movement control section, the process using the first comparing section, the process using the second movement control section and the process using the second comparing section are performed for the gray image of the first image and the gray image of the second image.

4. The information processor according to claim 1, further comprising:
   a manuscript position aligning section that aligns a position of first manuscript image and a position of a second manuscript image by performing a geometric transformation process for the first manuscript image; and
   an image obtaining section that obtains as the first image, a partial image of one of the first manuscript image having been subjected to the geometric transformation process by the manuscript position aligning section and the second manuscript image, and obtains as the second image, a partial image of the other of the first manuscript image having been subjected to the geometric transformation process by the manuscript position aligning section and the second manuscript image.

5. The information processor according to claim 4, wherein the image obtaining unit obtains the partial image of the second manuscript image as the first image, and the image obtaining unit obtains the partial image of the first manuscript image having been subjected to the geometric transformation process by the manuscript position aligning section as the second image.

6. The information processor according to claim 4, wherein an interpolation method used for (i) the geometric transformation process included in the first process, (ii)an interpolation method used for the geometric transformation process included in the second process, (iii) an interpolation method used for the geometric transformation process and performed by the position aligning section, and (iv) an interpolation method used for the geometric transformation process and performed by the manuscript position aligning section are all the same.

7. The information processor according to claim 1, further comprising:
   a magnifying section that sequentially magnifies the first image at multiple magnification ratios while moving the first image from the reference position to the target second position by performing a third process including at least one geometric transformation process for the first image after the target second position is selected;

a third comparing section that compares the first image having been subjected to the third process with the second image each time the magnifying section performs the third process; and a target magnification ratio selecting section that selects a target magnification ratio from among the multiple magnification ratios based on the comparison result of the third comparing section, wherein the position aligning section performs the geometric transformation process based on the difference and the target magnification ratio for the first image.

8. The information processor according to claim 1, further comprising:

a rotating section that sequentially rotates the first image at multiple rotation angles while moving the first image from the reference position to the target second position by performing a third process including at least one geometric transformation process for the first image after the target second position is selected;

a third comparing section that compares the first image having been subjected to the third process with the second image each time the magnifying section performs the third process; and a target rotation angle selecting section that selects a target rotation angle from among the multiple rotation angles based on the comparison result of the third comparing section, wherein the position aligning section performs the geometric transformation process based on the difference and the target rotation angle for the first image.

9. A non-transitory computer readable medium storing a program causing a computer to execute a process for a position alignment for images, the process comprising:

sequentially moving a first image from a reference position to multiple first positions, in which displacements in a reference direction between the reference position and the multiple first positions are multiples of a reference distance, by performing a first process including at least one geometric transformation process for the first image;

comparing the first image having been subjected to the first process with a second image each time the first process is performed;

selecting a target first position from among the multiple first positions based on the comparing the first image having been subjected to the first process with a second image each time the first process is performed;

sequentially moves the first image from the reference position to multiple second positions, in which displacements in the reference direction between the target first position and the multiple second positions are smaller than the reference distance, by performing a second process including at least one geometric transformation process for the first image after the target first position is selected;

comparing the first image having been subjected to the second process with the second image each time the second process is performed;

selecting a target second position from among the multiple second positions based on the comparing the first image having been subjected to the second process with the second image each time the second process is performed; and aligning the positions of the first image and the second image by performing a geometric transformation process for the first image based on the difference between the reference position and the target second position.

10. An information processing method comprising:

sequentially moving, by a processor, a first image from a reference position to multiple first positions, in which displacements in a reference direction between the reference position and the multiple first positions are multiples of a reference distance, by performing a first process including at least one geometric transformation process for the first image;

comparing the first image having been subjected to the first process with a second image each time the first process is performed;

selecting a target first position from among the multiple first positions based on the comparing the first image having been subjected to the first process with a second image each time the first process is performed;

sequentially moves the first image from the reference position to multiple second positions, in which displacements in the reference direction between the target first position and the multiple second positions are smaller than the reference distance, by performing a second process including at least one geometric transformation process for the first image after the target first position is selected;

comparing the first image having been subjected to the second process with the second image each time the second. process is performed;

selecting a target second position from among the multiple second positions based on the comparing the first image having been subjected to the second process with the second image each time the second process is performed; and aligning the positions of the first image and the second image by performing a geometric transformation process for the first image based on the difference between the reference position and the target second position.

* * * * *